(12) United States Patent
Illerhaus et al.

(10) Patent No.: US 8,061,497 B2
(45) Date of Patent: Nov. 22, 2011

(54) DISK CLUTCH OR MULTIPLE DISK BRAKE COMPRISING A MULTI-PART DISK CARRIER

(75) Inventors: Dietmar Illerhaus, Lindau (DE); Michael Obergasser, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 329 days.

(21) Appl. No.: 12/307,154

(22) PCT Filed: Jun. 29, 2007

(86) PCT No.: PCT/EP2007/056552
§ 371 (c)(1),
(2), (4) Date: Dec. 31, 2008

(87) PCT Pub. No.: WO2008/006711
PCT Pub. Date: Jan. 17, 2008

(65) Prior Publication Data
US 2009/0308707 A1 Dec. 17, 2009

(30) Foreign Application Priority Data
Jul. 10, 2006 (DE) .................. 10 2006 031 786

(51) Int. Cl.
*F16D 13/72* (2006.01)
(52) U.S. Cl. ............... 192/70.12; 192/113.34; 188/71.5; 188/264 D
(58) Field of Classification Search ............... 192/70.12, 192/113.36
See application file for complete search history.

(56) References Cited

U.S. PATENT DOCUMENTS

| | | | |
|---|---|---|---|
| 3,080,774 A * | 3/1963 | Nickerson et al. ........ | 192/113.36 |
| 4,270,647 A | 6/1981 | Leber | |
| 4,566,572 A | 1/1986 | Flotow et al. | |
| 4,971,184 A | 11/1990 | Lederman | |
| 5,439,087 A | 8/1995 | Umezawa | |
| 6,006,881 A * | 12/1999 | Lederman et al. ............... | 192/45 |
| 6,202,814 B1 | 3/2001 | Braford, Jr. | |
| 6,945,371 B2 * | 9/2005 | Schmidt ..................... | 192/70.12 |

FOREIGN PATENT DOCUMENTS

| | | |
|---|---|---|
| DE | 71 45 091 | 3/1972 |
| DE | 28 02 676 A1 | 8/1979 |
| DE | 41 36 040 C1 | 1/1993 |
| FR | 2 557 941 A1 | 7/1985 |

* cited by examiner

*Primary Examiner* — David D Le
*Assistant Examiner* — Jacob S Scott
(74) *Attorney, Agent, or Firm* — Davis & Bujold, P.L.L.C.

(57) ABSTRACT

A disk clutch or brake, with inner and outer disk carriers that respectively carry inner and outer disks. The inner and outer disks are arranged axially in alternation next to one another. At least one of the inner and outer disk carriers have radial openings through which coolant flows toward the disks. The inner and/or outer disk carrier have a toothed component, which is fixed to and at least partially axially and radially encompasses a basic component. The inner or outer disks are fixed toothed component to prevent relative rotation while allowing axial displacement. Radial openings are formed in the basic and toothed components to enable a flow of coolant.

6 Claims, 1 Drawing Sheet

DISK CLUTCH OR MULTIPLE DISK BRAKE COMPRISING A MULTI-PART DISK CARRIER

This application is a national stage completion of PCT/EP2007/056552 filed Jun. 29, 2007, which claims priority from German Application Serial No. 10 2006 031 786.6 filed Jul. 10, 2006.

FIELD OF THE INVENTION

The invention concerns a disk clutch or a multiple-disk brake with an inner disk carrier carrying inner disks and an outer disk carrier carrying outer disks in which the inner disks and the outer disks are arranged axially in alternation next to one another and in which the inner disk carrier and/or the outer disk carrier has at least one radial bore for the passage of a coolant in the direction toward the disks.

BACKGROUND OF THE INVENTION

Such disk clutches or disk brakes are known in various design embodiments. For example, they are used as shift elements in automatic transmissions of motor vehicles. When made as a wet-running disk clutch this is arranged as the starting clutch in a motor vehicle transmission or even outside it. Wet-running starting clutches are usually cooled by cooling oil radially on the inside, since due to the rotation of the input or outlet side of the clutch, this cooling oil is driven centrifugally outward, providing a transporting action for the cooling oil heated in the clutch.

In the case of a wet-running multiple-disk brake used as a shift member in a variable-speed automatic transmission, this radial transport of the cooling oil is not possible or only very ineffectively so since, when the brake is engaged a rotating brake component is brought to rest against a static brake component with uptake of energy. Accordingly, such brakes are usually either operated completely immersed in the cooling oil or supplied with cooling oil in a controlled manner by way of a pressure gradient.

A conventional wet-running disk clutch is known from DE 41 36 040 C1 in which the cooling oil is delivered to the clutch disks radially from the inside outward. For this, radial openings are formed in an inner disk carrier in an area under the friction linings of the clutch disks, through which the cooling oil can pass to the latter. To achieve an optimum cooling action relatively many radial openings or bores are provided in the disk carrier, which entails comparatively high production costs and can have an adverse effect on the mechanical stability of the disk carrier.

Furthermore, U.S. Pat. No. 6,202,814 B1 discloses a multiple-disk brake in an automatic transmission in which cooling oil can pass to the disks from the outside inward through an annular channel formed radially above the disk set. This cooling oil delivery takes place under pressure and is controllable by a separate valve. In this disk brake, the one-piece disk carrier, fixed on the housing, has radial bores through which the cooling oil can pass from the annular channel to the disks.

To sufficiently cool the disks, a technical solution, illustrated in FIG. 2, has also become known. In this case an inner disk carrier 1 of a disk clutch is formed as a hub 2 on the radially outer side of which driving teeth 3 for holding the inner disks (not shown here), rotationally fixed, are arranged in the usual manner. Through an axial oil delivery duct 4, a cooling oil can be delivered to the inner disk carrier 1, which then continues on through a plurality of radial bores 5, 6, 7, 8 toward the driving teeth 3 and the clutch disks.

To obtain a particularly effective cooling action and to reduce the number of radial bores while also achieving greater mechanical integrity of the inner disk carrier 1, the bores 5, 6, 7 and 8 are formed more or less radially obliquely in the inner disk carrier 1. However, this is not particularly advantageous in relation to production costs, since these openings 5, 6, 7 and 8 in the inner disk carrier 1 cannot be made by more inexpensive stamping methods.

The purpose of the present invention is to further develop a wet-running disk clutch or disk brake so that a good cooling action is obtained and so that it can be produced more inexpensively than known disk clutches or disk brakes while having comparable cooling properties.

SUMMARY OF THE INVENTION

The invention is based on the recognition that an optimum supply of cooling oil to the disks can be achieved by a plurality of radial openings in the disk carrier. These several radial openings in the disk carrier, however, can affect its mechanical stability adversely. If the many radial openings in the disk carrier are replaced by comparatively few bores directed more or less obliquely in the disk carrier, this entails carrying out boring processes on the disk carrier, which are elaborate and hence cost-intensive. This conflict can be resolved by a multi-part disk carrier with a basic component and a second component fixed co-axially thereto.

Accordingly, the invention starts from a disk clutch or disk brake having an inner disk carrier which carries inner disks and an outer disk carrier which carries outer disks. The inner and outer disks are arranged axially in alternation next to one another, and in which the inner disk carrier and/or the outer disk carrier has at least one opening for the passage of a coolant toward the disks. In addition, this disk clutch or disk brake is characterized in that the inner and/or the outer disk carrier is made with more than one part; with a basic component, and a toothed component attached to the basic component and at least in part embracing the basic component axially and radially, on which the inner or outer disks can be attached in a rotationally fixed manner, but able to move axially, and in that in the basic component and in the toothed component, radial openings are formed, which are in flow communication with one another.

In a mechanically more stable basic component, this structure makes it possible to form a few radial passage openings for the coolant with comparatively large diameters, and in the toothed component to provide selectively comparatively many openings, preferably with smaller diameters, to allow passage of the coolant toward the disks. In both components of the disk carrier, the openings can be formed by simple stamping processes or as bores directed radially straight.

The design of this disk clutch or disk brake, according to the invention, also provides that the basic component has an axial fluid supply duct in flow communication with the at least one radial opening in the basic component.

The toothed component is preferably largely of hollow-cylindrical form and is connected by welding and/or with positive interlock to the basic component. In addition, the toothed component has driving teeth to receive the disks.

According to another feature, on the toothed component there are formed bosses which project radially toward the basic component and are spaced apart axially, which keep the basic component and the toothed component apart, maintaining an annular space between them. Alternatively, spacer rings or sealing rings can be arranged, between the basic and the toothed components in the area of their axial ends, between which the annular space is formed.

The annular space is in flow communication with the at least one radial opening of the basic component so that, as a cylindrical distribution space, it can be filled with the coolant. From there, the coolant passes through the radial openings in the toothed component to the disks of the disk clutch or disk brake. The openings in the toothed component are preferably distributed around it uniformly, both circumferentially and axially.

For the mechanical connection of the basic component and the toothed component, it can also be provided that on at least one of its two axial ends, the toothed component has a radial circumferential flange or a radially projecting collar such that it can be clamped firmly in a respective annular groove of the basic component and/or fixed by welding or bonding.

As a final feature of the disk clutch or disk brake, it is preferably provided that the number of openings in the basic component is smaller than the number of openings in the toothed component, and that the diameter of the openings in the basic component, is larger than the diameter of the openings in the toothed component. This structure makes for great mechanical stability of the disk carrier while enabling the coolant to flow through it very effectively.

BRIEF DESCRIPTION OF THE DRAWING

To clarify the invention the description of a drawing also showing an example embodiment is attached. The drawing shows.

DETAILED DESCRIPTION OF THE INVENTION

Figure 1:
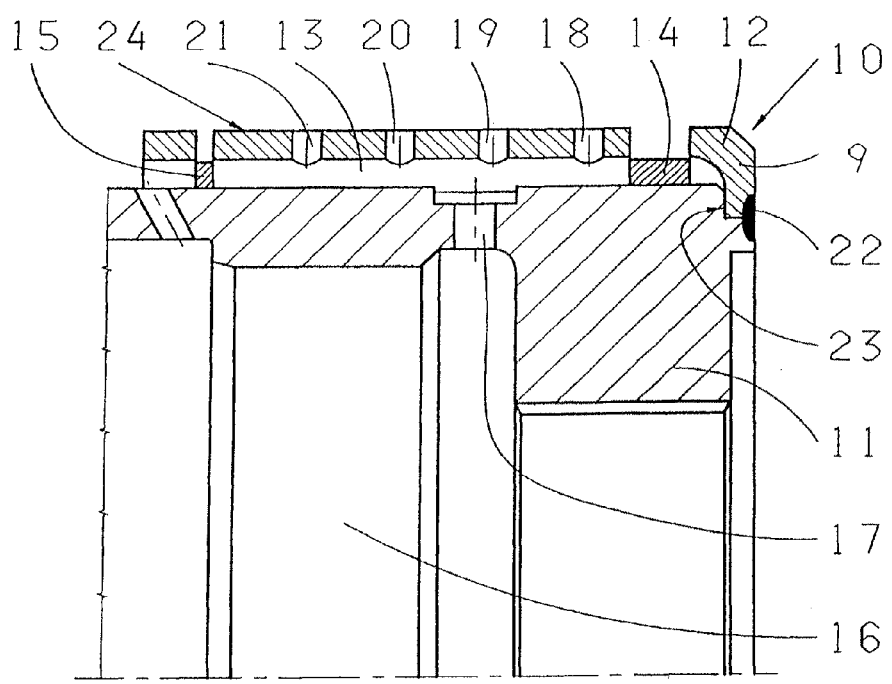
FIG. 1 is a schematic longitudinal section through an inner disk carrier of a disk clutch designed according to the invention.
Figure 2:
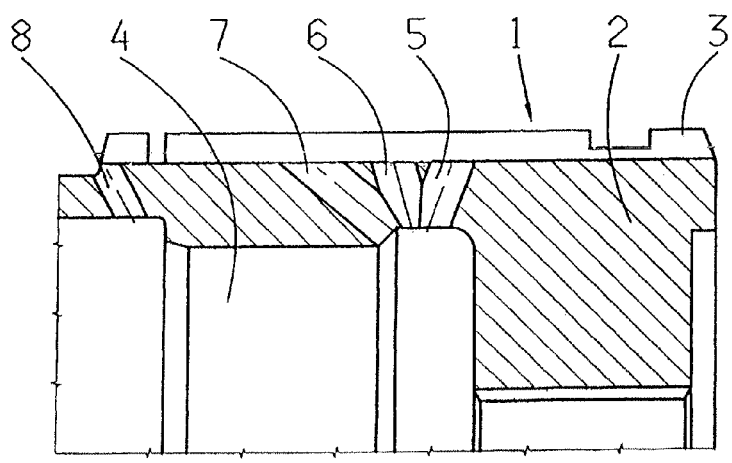
FIG. 2 is a representation like that of FIG. 1, but of an inner disk carrier according to the prior art.

In contrast to the configuration of the known inner disk carrier 1, already explained earlier and illustrated in FIG. 2, a disk carrier 10 according to the invention and shown in FIG. 1, is made of at least two components. These consist of a metallic basic component 11 that functions as the hub 2 of the disk carrier 10 and a toothed component 12 shaped from a sheet, which are positioned co-axially one inside the other. The toothed component 12 encompasses the basic component 11, both axially and radially. With its driving teeth 24, the toothed component 12 serves, among other things, to hold the disks of the disk clutch 10 (not shown here), which in a known manner can be made either as sheet disks or as lining disks.

At least in the area of its axial ends, the toothed component 12 also has bosses 14 and 15, which project toward the basic component 11 and so keep the toothed component 12 and the basic component 11 a distance apart from one another.

In an alternative embodiment, projections of this type can also be formed on the basic component 11, extending toward the toothed component 12. The same function, however, can also be performed by metallic securing rings and/or sealing rings made of an elastomer material inserted between the basic component 11 and the toothed component 12.

In this way, an annular space 13 is formed, between the two radial projections 14 and 15, and the basic component 11 and the toothed component 12. This annular space 13 is in flow communication, via at least one radial opening 17 in the basic component 11, with an axial fluid supply duct 16 in the inner disk carrier 10 so that the annular space 13 can be supplied with coolant from the latter. From the annular space 13, the coolant passes, via radial openings 18, 19, 20, 21 in the toothed component 12, to the inner disks (not shown here) of the inner disk carrier 10.

FIG. 1 clearly shows that in the basic component 11, by comparison with the toothed component 12, there are only relatively few radial openings 17 or bores for passing on the coolant. Nevertheless, in order to ensure a good supply to the annular space 13, these openings 17 have a larger diameter compared with the radial openings 18, 19, 20, 21 in the toothed component 12.

Since the toothed component 12 serves to further transmit a torque that is to be transmitted by the disks of the disk carrier 10, the component 12 is connected to the basic component 11 in a shear-resistant manner. The connection can be formed in various ways. In the example embodiment, according to FIG. 1, for this purpose the basic component 11 has an annular groove 23 at its end in which a radially inward-extending collar 9 of the toothed component 12 is fixed by way of a weld 22. A rotation-preventing connection, between the basic component 11 and the toothed component 12 is preferably also provided at their other axial ends.

REFERENCE NUMERALS 1 inner disk carrier
2 hub
3 driving teeth
4 axial oil supply duct in the hub
5 radial bore in the hub
6 radial bore in the hub
7 radial bore in the hub
8 radial bore in the hub
9 radial collar on the toothed component
10 inner disk carrier
11 basic component; hub
12 toothed component
13 annular space
14 projection; sealing ring
15 projection; sealing ring
16 axial fluid supply duct in the hub
17 radial opening in the basic component
18 radial opening in the toothed component
19 radial opening in the toothed component
20 radial opening in the toothed component
21 radial opening in the toothed component
22 weld
23 annular groove in the end of the basic component
24 driving teeth

The invention claimed is:

1. A disk clutch or disk brake, with an inner disk carrier that carries inner disks and an outer disk carrier that carries outer disks, the inner disks and the outer disks being arranged axially in alternation next to one another, and at least one of the inner disk carrier and the outer disk carrier have at least one radial opening for passage of a coolant toward the inner disks and the outer disks, at least one of the inner disk carrier (10) and the outer disk carrier comprising more than one part, with a basic component (11) and with a toothed component (12) which is rotationally fixed to and at least partially axially and radially encompasses the basic component (11), one of the inner disks or the outer disks are rotationally fixed to the toothed component (12) to prevent relative rotation but allow axial displacement therebetween, radial openings (17; 18, 19, 20, 21) are formed in the basic component (11) and in the toothed component (12), which are in flow communication with one another, and the toothed component (12) is formed substantially as a hollow cylinder and is fixed, via at least one of a weld or a positive interlock, to the basic component (11) for transmitting torque; and the toothed component (12) has projections (14, 15) that extend toward the basic component (11) and are spaced axially apart, which keep the basic component (11) and the toothed component (12) a distance apart from one another so that an annular space (13) is formed therebetween.

2. The disk clutch or disk brake according to claim 1, wherein the basic component (11) has an axial fluid supply duct (16), which is in flow communication with at least one of the radial openings (17) of the basic component (11).

3. The disk clutch or disk brake according to claim 1, wherein the annular space (13) is in flow communication with the at least one of the radial openings (17) of the basic component (11).

4. The disk clutch or disk brake according to claim 1, wherein the radial openings (18, 19, 20, 21) of the toothed component (12) are distributed circumferentially and axially around the toothed component (12), such that, the coolant can pass to the inner and the outer disks.

5. A disk clutch or disk brake, with an inner disk carrier that carries inner disks and an outer disk carrier that carries outer disks, the inner disks and the outer disks being arranged axially in alternation next to one another, and at least one of the inner disk carrier and the outer disk carrier have at least one radial opening for passage of a coolant toward the inner disks and the outer disks, at least one of the inner disk carrier (10) and the outer disk carrier comprising more than one part, with a basic component (11) and with a toothed component (12) which is rotationally fixed to and at least partially axially and radially encompasses the basic component (11), one of the inner disks or the outer disks are rotationally fixed to the toothed component (12) to prevent relative rotation but allow axial displacement therebetween, radial openings (17; 18, 19, 20, 21) are formed in the basic component (11) and in the toothed component (12), which are in flow communication with one another, and the toothed component (12) is formed substantially as a hollow cylinder and is fixed, via at least one of a weld or a positive interlock, to the basic component (11) for transmitting torque; and the toothed component (12) has at least one radially extending collar (9) or a flange at an end, by means of which the toothed component (12) is clamped firmly in an annular groove (23) of the basic component (11) or attached thereto by one of a weld (22) or bonding.

6. A disk clutch or disk brake, with an inner disk carrier that carries inner disks and an outer disk carrier that carries outer disks, the inner disks and the outer disks being arranged axially in alternation next to one another, and at least one of the inner disk carrier and the outer disk carrier have at least one radial opening for passage of a coolant toward the inner disks and the outer disks, at least one of the inner disk carrier (10) and the outer disk carrier comprising more than one part, with a basic component (11) and with a toothed component (12) which is rotationally fixed to and at least partially axially and radially encompasses the basic component (11), one of the inner disks or the outer disks are rotationally fixed to the toothed component (12) to prevent relative rotation but allow axial displacement therebetween, radial openings (17; 18, 19, 20, 21) are formed in the basic component (11) and in the toothed component (12), which are in flow communication with one another, and the toothed component (12) is formed substantially as a hollow cylinder and is fixed, via at least one of a weld or a positive interlock, to the basic component (11) for transmitting torque; and the number of the radial openings (17) in the basic component (11) is smaller than the number of the radial openings (18, 19, 20, 21) in the toothed component (12), and a diameter of the radial openings (17) in the basic component (11) is larger than a diameter of the radial openings (18, 19, 20, 21) in the toothed component (12).

* * * * *